March 17, 1953 A. A. MUEHLING 2,631,414
HONING TOOL WITH GAUGE
Filed Dec. 13, 1950 3 Sheets-Sheet 1
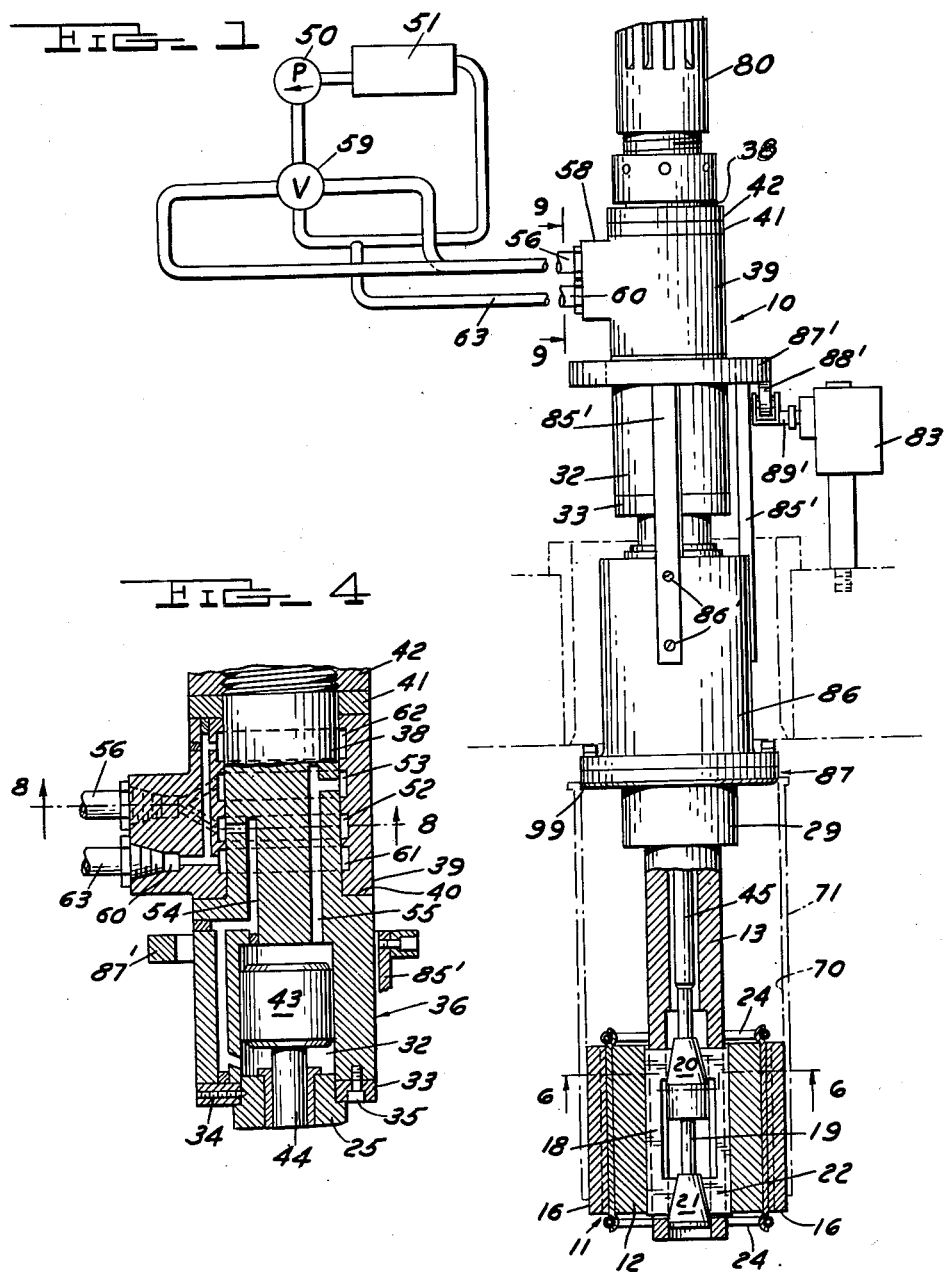
INVENTOR.
ANTHONY A. MUEHLING
BY
Whittemore Hulbert & Belknap
ATTORNEYS March 17, 1953 A. A. MUEHLING 2,631,414
HONING TOOL WITH GAUGE
Filed Dec. 13, 1950 3 Sheets-Sheet 2
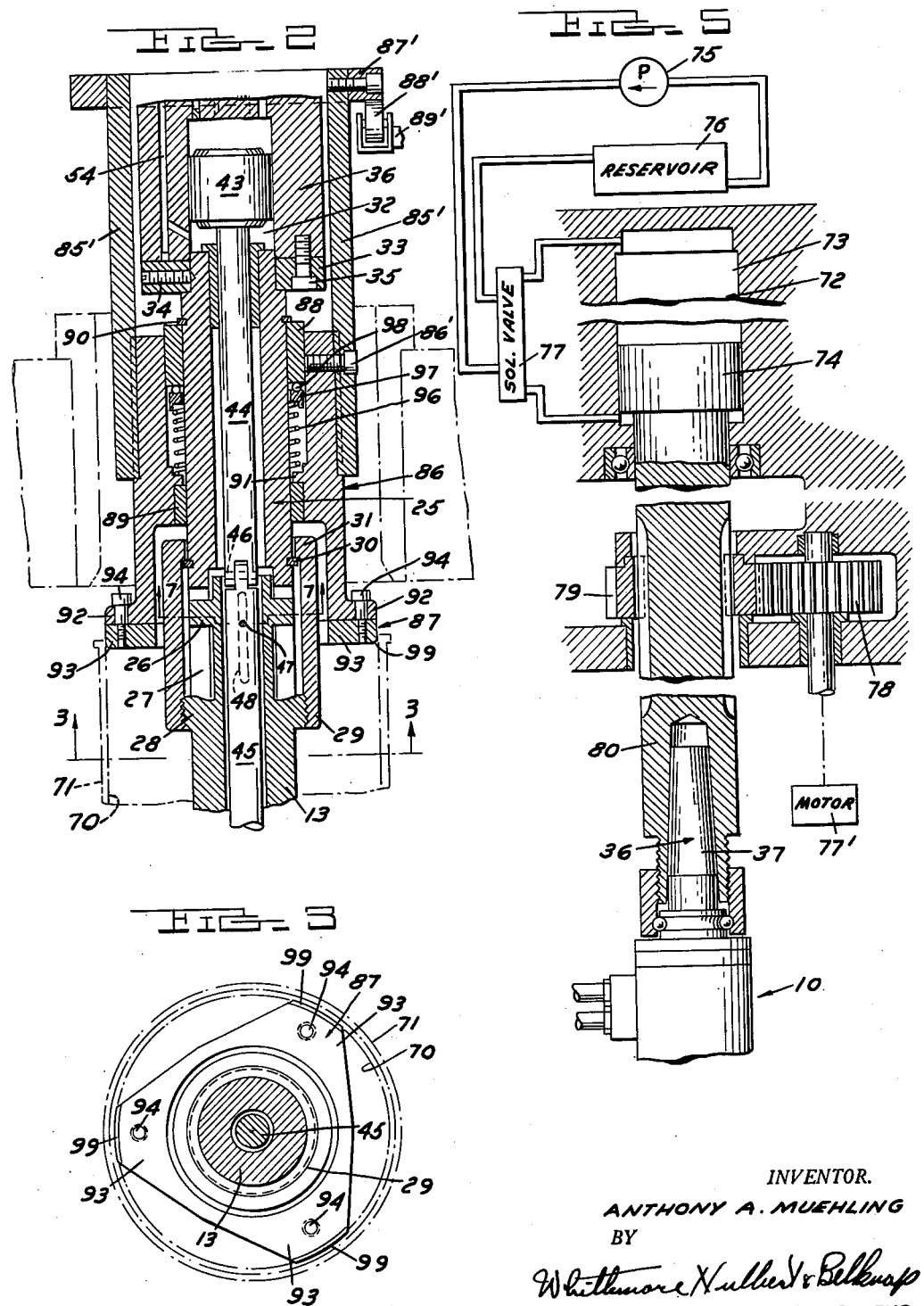
INVENTOR.
ANTHONY A. MUEHLING
BY
Whittemore Hulbert & Belknap
ATTORNEYS March 17, 1953  A. A. MUEHLING  2,631,414
HONING TOOL WITH GAUGE
Filed Dec. 13, 1950  3 Sheets-Sheet 3
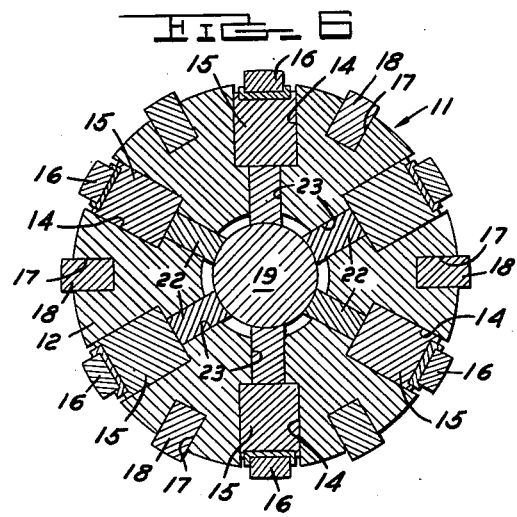
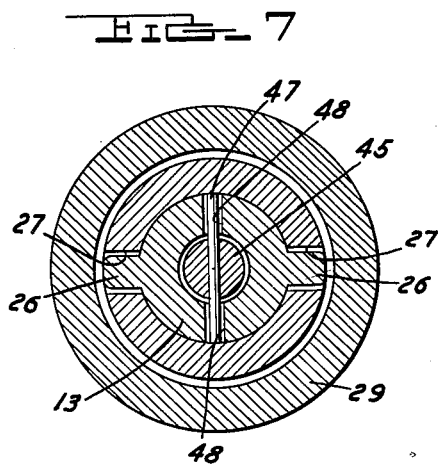
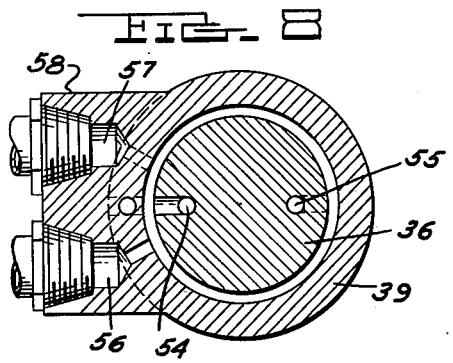
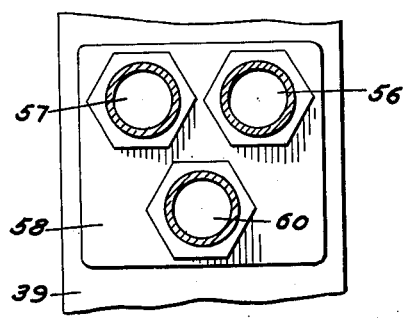
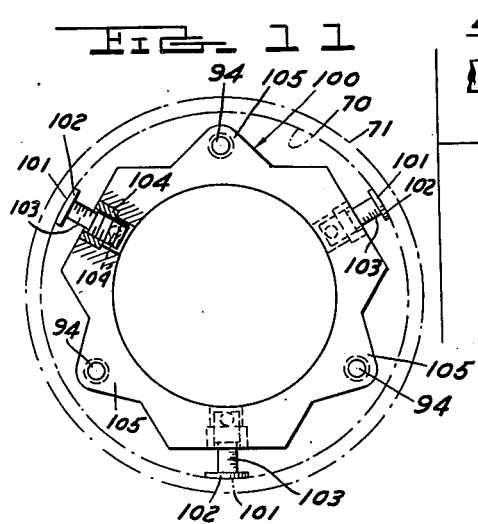
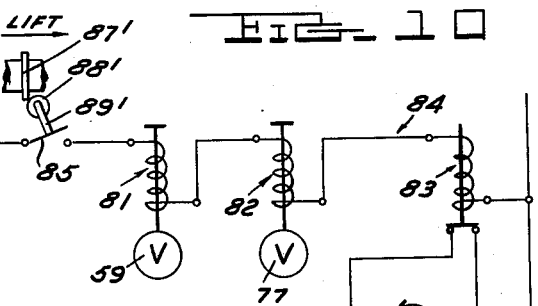
INVENTOR.
ANTHONY A. MUEHLING
BY
ATTORNEYS Patented Mar. 17, 1953

2,631,414

UNITED STATES PATENT OFFICE 2,631,414

HONING TOOL WITH GAUGE

Anthony A. Muehling, Detroit, Mich., assignor to Mid-West Abrasive Company, Owosso, Mich., a corporation of Delaware Application December 13, 1950, Serial No. 200,570

8 Claims. (Cl. 51—184.3)

This invention relates generally to honing apparatus and refers more particularly to apparatus of this type having means for gaging the surface of the work piece being honed.

In accordance with this invention, the apparatus has a honing head movable over a surface of a work piece to remove excess material from the surface, and it is an object of this invention to stop the honing operation on the surface after the excess material on the surface is removed; or in other words, after the surface has been honed to a predetermined dimension.

It is another object of this invention to provide a honing apparatus having a gage movable over the surface of the work piece in response to removal of the excess material from the surface by the honing operation, and having means for stopping the honing operation in response to movement of the gage over the surface of the work piece.

It is still another object of this invention to provide a construction of the above general type wherein the gage is urged by a yielding force in a direction toward the work piece and is held against movement in said direction by the excess material on the surface, or in other words, by the amount of material to be removed from the surface. Thus as soon as this excess material is removed from the surface, the yielding force moves the gage relative to the work piece along the surface.

It is a further object of this invention to provide means operated by the gage as it moves over the honed surface of the work piece for stopping the honing operation and for collapsing the honing head.

It is still a further object of this invention to provide a gage of the above general type having gaging surfaces distributed around the axis of the gage and spaced equal distances from the gage axis to provide the equivalent of a three point support for the gage in a bore honed by the head. The radial spacing between the gage axis and the gaging surfaces corresponds to the radius of the finished bore so that after the bore is honed by the head to this radius, the gage moves relative to the work piece into the bore.

Still another object of the invention is to provide means for varying the distance between the gaging surfaces and axis of the gage to enable adjusting the effective diameter of the gage.

The foregoing as well as other objects will be made more apparent as this description proceeds, especially when considered in connection with the accompanying drawings, wherein:

Figure 1 is a longitudinal fragmentary sectional view through honing apparatus embodying the features of this invention;

Figure 2 is an enlarged sectional view of a part of the apparatus shown in Figure 1;

Figure 3 is a cross sectional view taken on the line 3—3 of Figure 2;

Figure 4 is a sectional view through a part of the apparatus in Figure 1 and showing the pressure responsive means for expanding and collapsing the honing head;

Figure 5 is a semi-diagrammatic view showing pressure responsive means for reciprocating the honing head relative to a work piece;

Figure 6 is a cross sectional view taken on the line 6—6 of Figure 1;

Figure 7 is a cross sectional view taken on the line 7—7 of Figure 2;

Figure 8 is a sectional view taken on the line 8—8 of Figure 4;

Figure 9 is a sectional view taken on the line 9—9 of Figure 1;

Figure 10 is a diagram of an electrical control circuit; and

Figure 11 is an elevational view partly in section of a modified gage.

For the purpose of illustrating this invention, honing apparatus is shown of the type generally employed to finish internal cylindrical surfaces such for example, as cylinder bores. With this in view, reference is made to Figure 1 of the drawings, wherein the numeral 10 designates a honing tool supported in a vertical position and having an abrading head 11 at the lower end thereof. The abrading head 11 may be of any suitable construction having a cylindrical enlargement 12 and having an upwardly extending reduced tubular portions 13. As shown particularly in Figure 6 of the drawings, the cylindrical enlargement 12 is formed with a plurality of slots 14 spaced equal distances from one another circumferentially of the enlargement and extending for the full length of the latter. Seated in each slot 14 is a holder 15 extending for the full length of the slot and having the outer surface recessed to receive an abrading element 16. It will also be noted from Figure 6 of the drawings that the enlargement 12 is formed with additional slots 17 respectively arranged between the slots 14, and of a size to receive the usual guides 18.

Supported within the cylindrical enlargement is a cone carrying member 19 having axially spaced cones 20 and 21 concentric with the axis of the abrading head. In accordance with conventional practice, the cones engage shoes 22 slidably supported in slots 23 formed in the cylindrical enlargement 12. The slots 23 are arranged in the enlargement 12 to open into the radially inner sides of the slots 14, so as to enable the shoes to engage the base portions of the holders 15. The shoes are held in frictional engagement with the respective holders 15 by garter springs 24, which respectively encircle projections at opposite ends of the holder.

The above arrangement is such that axial movement of the member 19 in an upward direction simultaneously moves the abrading elements 16 radially outwardly against the surface of the bore within which the abrading head is located. On the other hand movement of the member 19 in a downward direction permits the springs 24 to contract the abrading head; or in other words, to move the abrading elements 16 radially inwardly.

Referring to Figures 2 and 7 of the drawings, it will be noted that the upper end of the tubular portion 13 telescopes into the lower end of a tubular driver 25 and has outwardly projecting diametrically opposed pins 26 which extend into elongated slots 27 formed in adjacent walls of the driver 25. The slots 27 extend to the lower end of the driver 25 to permit assembly of the portion 13 with the driver 25. Thus rotation of the driver 25 imparts a corresponding rotation to the portion 13 and head 11.

The tubular portion 13 and driver 25 are relatively positioned axially thereof by an enlargement 28 formed on the portion 13 intermediate the ends thereof and engageable with the lower end of the driver 25. The lower end of the driver 25 is generally spherically shaped and the adjacent surface of the enlargement 28 may be fashioned to provide a spherically shaped seat for the lower end of the driver. The construction is such as to permit limited angular movement of the driver 25 relative to the portion 13. The driver 25 and portion 13 are coupled together by a sleeve 29.

The sleeve 29 is threaded or otherwise attached at its lower end to the enlargement 28 and is held in position on the driver 25 by a split ring 30. The ring 30 is seated in an annular groove formed in the driver 25 intermediate the ends thereof and engages the under side of an annular flange 31 extending radially inwardly from the upper end of the coupling sleeve 29. Thus the driver 25 and tubular part 13 are readily detachably held in assembled relationship by the coupling sleeve 29.

The upper end of the driver 25 projects into the lower end of a cylinder 32 and is secured to the cylinder 32 by a ring 33. The ring 33 is fixed to the upper end of the driver 25 by a set screw 34 and is secured to the bottom of the cylinder 32 by studs 35. The cylinder 32 is shown in Figure 2 of the drawing as formed in the lower end of a spindle 36 having a tapered shank 37 at the upper end and having a cylindrical portion 38 intermediate the ends. The cylindrical portion 38 is of reduced diameter relative to the lower end of the spindle 36 and is journalled in a sleeve 39. The lower end of the sleeve 39 seats on the annular shoulder 40 formed by the reduced portion 38 and the upper end of the sleeve 39 is engaged by a thrust bearing 41 secured in place against the upper end of the sleeve 39 by a ring 42 threaded on the cylindrical portion 38 of the spindle. It follows from the above that the spindle 36, driver 25 and abrading head 11 rotate as a unit relative to the sleeve 39.

A piston 43 is supported in the cylinder 32 for sliding movement relative thereto, and is connected to the cone carrying member 19 for actuating the latter to adjust the abrading elements 16. The connection between the piston 32 and cone carrying member 19 comprises a pair of rods 44 and 45. The rod 44 is connected at its upper end to the piston 43, and is slidably supported within the tubular driver 25. The lower end of the rod 45 is secured to or formed integral with the upper end of the member 19, and extends through the tubular part 13. The adjacent or inner ends of the rods are pivotally connected together with a pin 46 having its axis perpendicular to the aligned axes of the rods to enable relative pivotal movement of the rods, and thereby compensate for any slight misalignment therebetween. Attention is called at this time to the location of the pivot pin 46 with respect to the coupling sleeve 29, and with respect to the slots 27. The arrangement is such that the pin 46 may be registered with the slots 27 upon detaching the coupling sleeve 29 from the part 28 and sliding the coupling sleeve upwardly along the driver 25. The pin 46 is then accessible and may be driven out of engagement with the adjacent ends of the rods 44 and 45. Thus the abrading head assembly 11 may be readily disconnected from or connected to the cylinder or spindle assembly.

The piston 43 is also rotatable as a unit with the cylinder and abrading head 11. As shown in Figure 7 a pin 47 extends transversely through the rod 45 adjacent the upper end thereof, and the opposite ends of the pin respectively project into elongated slots 48 formed in diametrically opposite sides of the tubular part 13. The length of the slots 48 is determined to permit unobstructed sliding movement of the rods relative to the part 13 by the piston 43, and the width of the slots is such as to provide for engagement of the projecting ends of the pin 47 with the tubular part 13 to effect rotation of the rods or piston 43 as a unit with the abrading head 11 and spindle 36.

The piston 43 is moved in opposite directions to correspondingly operate the cone carrying member 19 by alternately connecting the cylinder 32 at opposite ends of the piston to a source of fluid under pressure 50, and to a reservoir 51. As shown particularly in Figure 4 of the drawings, the sleeve 39 is formed with axially spaced annular grooves 52 and 53. The groove 52 communicates with a passage 54 formed in the spindle 36, and this passage also communicates with the cylinder 32 at a point below the piston 43. The groove 53 communicates with a passage 55 also formed in the spindle 36, and communicates with the cylinder 32 at a point above the piston 43.

The grooves 52 and 53 also respectively communicate with a pair of ports 56 and 57 formed in an enlargement 58 of the sleeve 39. The ports 56 and 57 are in turn connected to the source of fluid under pressure 50, and the reservoir 51 through a suitable valve indicated diagrammatically by the numeral 59. The design of the valve is such that it has at least three positions. In one position of the valve 59 the port 56 is connected to the source 50, and the port 57 is connected to the reservoir 51. As a result fluid under pressure is admitted to the bottom of the cylinder 32 through the passage 54, and the top of the cylinder is connected to the reservoir. Thus the piston 43 is moved upwardly in the cylinder 32, and the cone carrying member 19 is also moved upwardly in the abrading head 11 to move the abrading elements 16 radially outwardly.

In the second position of the valve 59, the port 57 is connected to the source 50, and the port 56 is connected to the reservoir with the result that fluid under pressure is introduced into the upper end of the cylinder 32 and is exhausted from the lower end of the cylinder. Accordingly the piston 43, together with the member 19, is moved downwardly, and the abrading elements 16 are moved radially inwardly by the garter springs 24. The third position of the valve may be an off position wherein the source 50 is connected to the reservoir and the ports 56 and 57 are closed.

Referring again to Figure 4 of the drawings, it will be noted that the sleeve 39 has a third port 60. This port is connected to a pair of annular grooves 61 and 62 formed in the inner surface of the sleeve. The annular groove 61 is located below the annular groove 52, and the annular groove 62 is located above the annular groove 53. Thus any fluid tending to escape in either direction is collected by the grooves 61 or 62 and returned to the port 60. This port is shown in Figure 1 of the drawings as connected to the reservoir 51 by a conduit 63.

It follows from the foregoing that the radial positon of the abrading elements 16 relative to the head 11 may be varied within very close limits by fluid pressure operated means. It will also be noted that the several parts of the apparatus are relatively simple in design, and may be readily assembled and disassembled for repair or replacement purposes.

During the honing operation the head 11 is reciprocated and rotated within a cylindrical bore 70 of a work piece 71. Any suitable mechanism may be provided for rotating and reciprocating the head 11 relative to the work piece. For the purpose of illustration reciprocation of the abrading head is accomplished by fluid pressure responsive means 72 connected to the spindle 36. As shown diagrammatically in Figure 5 of the drawings, the fluid pressure responsive means 72 comprises a cylinder 73 and a piston 74 slidably supported in the cylinder 73. The piston 74 is connected to the upper end of the spindle 36 by a driving member 80 and is moved in opposite directions in the cylinder 73 by fluid under pressure. The opposite ends of the cylinder 73 are alternatively connected to a suitable pump 75 and a reservoir 76 through a four-way valve 77.

The spindle 36 is rotated during reciprocation thereof by a power unit including an electric motor 77'. A pinion 78 is driven by the motor 77' and this pinion meshes with a gear 79 splined on the driving member 80. The member 80 is secured on the spindle 36 so that rotation of the member 80 by the motor 77' imparts rotation to the abrading head 11. The splined connection between the gear 79 and member 80 enables reciprocation of the member 80 and spindle 36 during rotation of the latter.

In the present instance the valve 59 and valve 77 are electrically operated by solenoids 81 and 82 respectively. The electric motor 77', on the other hand, is controlled by a relay switch 83. As shown in Figure 10 of the drawings, the solenoids and relay are electrically connected in a control circuit 84 in series with a limit switch 85. As will be more fully hereinafter set forth the limit switch 85 is automatically operated to close the control circuit 84 when the cylindrical surface of the bore 70 in the work piece 71 is honed or finished to a predetermined diameter. Closing of the limit switch 85 energizes the solenoids 81 and 82 as well as the relay 83. When the solenoid 81 is energized the valve 59 is operated to move the piston 43 downwardly in the cylinder 32 and thereby cause the abrading members on the head 11 to retract from the cylindrical surface of the work piece. Energization of the coil 82, on the other hand, operates the valve 77 to bypass fluid pressure from the pump 75 to the reservoir 76 and thereby stop reciprocation of the abrading head. At the same time the solenoids 81 and 82 are energized, the relay 83 is operated to open the circuit to the electric motor 77' and thereby stop rotation of the abrading head.

The means for operating the switch 85 to stop the honing operation when the bore 71 in the work piece is honed to the desired diameter comprises a tubular housing 86 and a gage 87. As shown particularly in Figure 2 of the drawings, the housing 86 is rotatably supported on the driver 25 by axially spaced plain bearings 88 and 89. The top bearing 88 is frictionally secured to the driver 25 and the upper end thereof abuts a split ring 90 secured to the driver 25. The bottom bearing 89 has a pressed fit with the inner cylindrical surface of the housing 86 and the upper end abuts an annular shoulder 91 extending radially inwardly from the housing 86. The construction is such that the bearing 88 has a running fit with the inner surface of the housing 86 and the bearing 89 has a running fit with the outer cylindrical surface of the driver 25.

It will further be noted from Figure 2 of the drawings that the lower end of the housing 86 is enlarged to freely receive the upper end of the coupling sleeve 29, and is formed with radially outwardly extending attaching lugs 92. The lugs 92 are spaced equal distances from each other around the axis of the housing 86, and in the present instance, three lugs are provided. The gage 87 in the present instance is in the form of a ring also having three lugs 93 projecting radially therefrom and spaced from each other equal distances around the axis of the ring in a manner to register with the lugs 92 on the housing 86. The gage or ring 87 is positioned below the lower end of the housing 86 in concentric relation to the axis of the housing and is secured to the housing by studs 94. The studs 94 respectively extend through the lugs 92 on the housing 86 and are threaded into the lugs 93 on the ring or gage 87.

As shown in Figure 3 of the drawings, the outer surfaces of the lugs 93 on the gage are ground or otherwise formed on a radius determined from the axis of the gage and are concentric to the latter axis. Also it will be observed from Figure 3 that the outer surfaces of the lugs 93 are spaced equal distances radially from the axis of the gage 87, and that the radius of the outer surfaces of the lugs 93 is equal to the radius to which it is desired to hone the cylindrical surface of the bore 70 in the work piece 71.

In practice the gage 87 assumes a position adjacent the upper end of the work piece 71, and in the present instance is yieldably urged toward the work piece 71 by a coil spring 96. As shown in Figure 2 of the drawings, the coil spring 96 surrounds the driver 25 within the housing 86, The lower end of the coil spring 96 abuts the top surface of the annular shoulder 91 on the housing 86, and the upper end of the coil spring engages a ring 97. The ring 97 surrounds the driver 25 within the housing 86 and a thrust bearing 98 is positioned between the ring and lower end of the bearing 88. Thus relative rotation between the driver 25 and housing 86 is permitted without interfering with the spring 96.

Although the spring 96 normally urges the gage 87 in a direction toward the work piece 71, nevertheless movement of the gage into the bore 70 of the work piece is prevented by the excess material on the inner cylindrical surface of the bore. The arrangement is such that as soon as the excess material is removed from the cylindrical surface of the bore 70 or in other words, when this cylindrical surface has been honed to the predetermined desired diameter, the spring 96 moves the housing 86 together with the gage 87 downwardly relative to the work piece 71. Thus the gage is moved into the bore 70. If desired the lower portions of the outer surfaces on the lugs 93 of the gage may be chamfered slightly as at 99 to pilot the gage into the bore 70 of the work piece.

In accordance with the present invention downward movement of the gage 87 into the bore 70 of the work piece operates the limit switch 85 to open the control circuit 84. As soon as the control circuit 84 is opened, the relay 83 stops the electric motor 77' and the solenoid 81 operates the valve 59 to lower the piston 43 in the cylinder 32, and thereby collapse the honing head in the bore 70 of the work piece. Also the solenoid 82 is operated to in turn operate the four-way valve 77 to a position wherein reciprocation of the honing head is discontinued. Thus from the foregoing it will be seen that as soon as the bore 70 in the work piece 71 is finished or honed to its predetermined diameter, the honing operation is automatically discontinued.

In the present instance the limit switch 85 is operated by arms 85' having the lower ends secured to the housing 86 at points spaced from each other circumferentially of the housing by studs 86' and having the upper ends secured to a ring 87'. The lower side of the ring 87' is positioned to engage a roller 88' suitably supported on the switch operating arm 89'. Thus downward movement of the housing 86 to extend the gage 87 into the bore 70 of the work piece 71 imparts a corresponding downward movement to the ring 87' and operates the limit switch 85 to discontinue the honing operation as previously described.

The embodiment of the invention shown in Figure 11 of the drawings illustrates a gage 100 having adjustable gaging surfaces 101. For the purpose of illustration the adjustable gaging surfaces 101 are formed on heads 102 of micrometer screws 103. The axis of the micrometer screws 103 extend radially with respect to the axis of the gage 100 and the screws are threadedly mounted in bushings 104 secured in bores formed in the gage. In the present instance three micrometer screws 103 are provided, and these screws are spaced equal distances from each other about the axis of the gage.

The gaging or outer surfaces 101 on the heads 102 of the micrometer screws 103 are on a radius determined from the axis of the gage, and this radius may be varied to within extremely close limits by adjusting the micrometer screws 103 relative to the gage. Any suitable means, such for example as set screws 104', may be provided for holding the micrometer screws in any desired adjusted position relative to the gage. It will also be noted that in Figure 11 of the drawings, the gage is formed with attaching lugs 105 respectively positioned intermediate the micrometer screws 103 and attachable to the lugs 92 on the housing 86 by the fastener elements 94. The gage 100 in Figure 11 of the drawings operates in the same manner as the gage 87 previously described. However, the gage 100 may be adjusted to gage bores of various different diameters, rendering it unnecessary to interchange gages when bores of different diameters are honed.

What I claim as my invention is:

1. Honing apparatus comprising a honing tool having mounted thereon a rotatable head having abrading elements positioned to engage a cylindrical surface of a work piece at points spaced from each other circumferentially of the surface, means supporting the abrading elements on the head for movement relative to the head radially of the axis of the head toward and away from the cylindrical surface, means for reciprocating the honing tool together with the head and abrading elements relative to the work piece, means for rotating the head during reciprocation of the latter to remove excess material from the cylindrical surface, a gage for the cylindrical surface carried by said honing tool for reciprocation therewith but restrained from movement in one direction by the excess material to be removed from the cylindrical surface, means interposed between said honing tool and gage for moving the gage in said one direction relative to the work piece in response to removal of the excess material from the cylindrical surface by the abrading elements, and means responsive to movement of the gage in said one direction relative to the work piece operative to stop rotation and reciprocation of the head and to move the abrading elements in a direction away from the surface.

2. Honing apparatus for removing excess material from a surface of a work piece, comprising a honing tool supported for movement along the surface of the work piece and having a head mounted thereon carrying abrading elements adapted to engage the surface of the work piece, means for moving said honing tool together with said head along the surface of the work piece to remove excess material therefrom, a gage for determining when the work piece has been finished to the desired size, means mounting said gage on said honing tool for limited movement relative to said honing tool and in the direction of movement of the latter, said gage having a gaging element positioned at one end of the surface for engagement with the excess material to be removed, thereby to restrain said gage against movement in one direction along the surface with said honing tool as the latter moves along the surface, and means interposed between said honing tool and gage for moving the gage in said one direction along the surface in response to removal of the excess material from the surface by the abrading elements.

3. Honing apparatus for removing excess material from a surface of a work piece, comprising a honing tool supported for reciprocation along the surface of the work piece and having a head mounted thereon carrying abrading elements adapted to engage the surface of the work piece, means for reciprocating said honing tool together with said head along the surface of the work piece to remove excess material therefrom, a gage for determining when the work piece has been finished to the desired size, means mounting said gage on said honing tool for limited movement relative to said honing tool and in the direction of reciprocation of the latter, said gage having a gaging element positioned at one end of the surface for engagement with the excess material to be removed, thereby to restrain said gage against movement in one direction along the surface with said honing tool as the latter moves along the surface, means interposed between said honing tool and gage for moving the latter in said one direction along the surface in response to removal of the excess material from the surface by the abrading elements, and means responsive to movement of said gage in said one direction along the surface of the work piece operative to stop reciprocation of said honing tool and head.

4. Honing apparatus for removing excess material from a cylindrical surface of a work piece, comprising a honing tool supported for reciprocation along the cylindrical surface of the work piece and having a head rotatably mounted thereon carrying abrading elements adapted to engage the cylindrical surface at circumferentially spaced points, means for reciprocating said honing tool together with said head along the cylindrical surface of the work piece, means for rotating said head during reciprocation of the latter to remove the excess material from the cylindrical surfaces, a gage for determining when the work piece has been finished to the desired size, means mounting said gage on said honing tool for limited movement relative to said honing tool and in the direction of reciprocation of the latter, said gage having a gaging element positioned at one end of the surface for engagement with the excess material to be removed, thereby to restrain said gage against movement in one direction along the surface with said honing tool as the latter moves along the surface, and means interposed between said honing tool and gage for moving the latter in said one direction along the surface in response to removal of the excess material from the surface by the abrading elements.

5. Honing apparatus for removing excess material from a cylindrical surface of a work piece, comprising a honing tool supported for reciprocation along the cylindrical surface of the work piece and having a head rotatably mounted thereon carrying abrading elements adapted to engage the cylindrical surface at circumferentially spaced points, means for reciprocating said honing tool together with said head along the cylindrical surface of the work piece, means for rotating said head during reciprocation of the latter to remove the excess material from the cylindrical surface, a gage for determining when the work piece has been finished to the desired size, means mounting said gage on said honing tool for limited movement relative to said honing tool and in the direction of reciprocation of the latter, said gage having a gaging element positioned at one end of the surface for engagement with the excess material to be removed, thereby to restrain said gage against movement in one direction along the surface with said honing tool as the latter moves along the surface, means interposed between said honing tool and gage for moving the latter in said one direction along the surface in response to removal of the excess material from the surface by the abrading elements, and means responsive to movement of said gage in said one direction along the surface of the work piece operative to stop rotation of said head and reciprocation of said honing tool and head.

6. Honing apparatus for removing excess material from the surface of a cylindrical bore in a work piece, comprising a honing tool supported for reciprocation toward and away from the work piece and having a head rotatably mounted thereon adapted to project into the bore, said head carrying abrading elements in positions to engage the surface of the bore at circumferentially spaced points, means for reciprocating said honing tool together with said head toward and away from the work piece for movement of said head along the surface of the bore, means for rotating said head during reciprocating of the latter to remove excess material from the surface, a gage for determining when the work piece has been finished to the desired size, means mounting said gage on said honing tool for limited movement relative to said honing tool and in the direction of reciprocation of the latter, said gage having circumferentially spaced gaging elements thereon positioned at one end of the surface for engagement with the excess material to be removed, thereby to restrain said gage against movement in one direction along the surface with said honing tool as said head moves along the surface, yieldable means interposed between said honing tool and gage for moving the latter in said one direction along the surface in response to removal of the excess material by the abrading elements, and means responsive to movement of said gage in said one direction along the surface of the work piece operative to stop rotation of said head and reciprocation of said honing tool and head.

7. Honing apparatus for removing excess material from the surface of a cylindrical bore in a work piece, comprising a honing tool supported adjacent one end thereof for reciprocation toward and away from the work piece and having a head rotatably mounted at the opposite end adapted to project into the bore, said head carrying abrading elements in positions to engage the surface of the bore at circumferentially spaced points, means for reciprocating said honing tool together with said head toward and away from the work piece for movement of said head along the surface of the bore, means for rotating said head during reciprocating of the latter to remove excess material from the surface, a gage for determining when the work piece has been finished to the desired size, means mounting said gage on said honing tool intermediate the ends thereof for limited movement relative to said honing tool and in the direction of reciprocation of the latter, said gage having circumferentially spaced gaging elements thereon positioned at one end of the surface for engagement with the excess material to be removed, thereby to restrain said gage against movement in one direction along the surface with said honing tool as said head moves along the surface, yieldable means interposed between said honing tool and gage for moving the latter in said one direction along the surface in response to removal of the excess material by the abrading elements, and means responsive to movement of said gage in said one direction along the surface of the work piece operative to stop rotation of said head and reciprocation of said honing tool and head.

8. The honing apparatus defined in claim 7 having means supporting the abrading elements on the head for movement relative to said head radially of the axis of the latter toward and away from the surface, and means responsive to movement of said gage in said one direction along the surface operative to move the abrading elements in a direction away from the surface.

ANTHONY A. MUEHLING.

REFERENCES CITED

The following references are of record in the file of this patent:

UNITED STATES PATENTS

| Number | Name | Date |
|---|---|---|
| Re. 16,141 | McDonough | Aug. 11, 1925 |
| 1,658,994 | Lauer | Feb. 14, 1928 |
| 2,148,337 | Blood | Feb. 21, 1939 |
| 2,229,318 | Wallace | Jan. 21, 1941 |
| 2,251,607 | Astrowski et al. | Aug. 5, 1941 |